United States Patent [19]

Mathews

[11] 4,170,528
[45] Oct. 9, 1979

[54] METHOD OF BALANCING A ROTATABLE ELEMENT

[75] Inventor: Will W. Mathews, Memphis, Tenn.

[73] Assignee: Cummins Engine Company, Inc., Columbus, Ind.

[21] Appl. No.: 902,650

[22] Filed: May 4, 1978

[51] Int. Cl.² .................... B23P 1/02; C25F 7/00
[52] U.S. Cl. .................... 204/129.2; 204/218; 204/224 M; 204/129.46
[58] Field of Search .................... 204/129.2, 228, 218, 204/224 M, 129.46

[56] References Cited

U.S. PATENT DOCUMENTS

| 3,301,776 | 1/1967 | Hughes | 204/228 X |
| 3,827,963 | 8/1974 | Callahan | 204/228 |

FOREIGN PATENT DOCUMENTS 1093963 12/1967 United Kingdom .................. 204/129.2

Primary Examiner—John H. Mack
Assistant Examiner—D. R. Valentine
Attorney, Agent, or Firm—Gary M. Gron; Robert T. Ruff

[57] ABSTRACT

The disclosure illustrates a method and apparatus for precision balancing a rotatable element such as the turbine shaft assembly of a turbocharger. The turbine-shaft assembly is placed in a machine that detects the position and degree of unbalance. The material contributing to the unbalance is then removed from the wheel using electrochemical machining in which material is removed from the turbine through anodic dissolution of the turbine wheel material by passage of a current through a conductive work piece and electrolyte to the wheel. A means is provided to indicate the time integrated current flow of the electrochemical machining process. The time integrated current flow is related to unbalance units so that the electrochemical machining is terminated when the desired amount of mass is removed to achieve balance by reaching the determined time integrated current flow.

2 Claims, 3 Drawing Figures

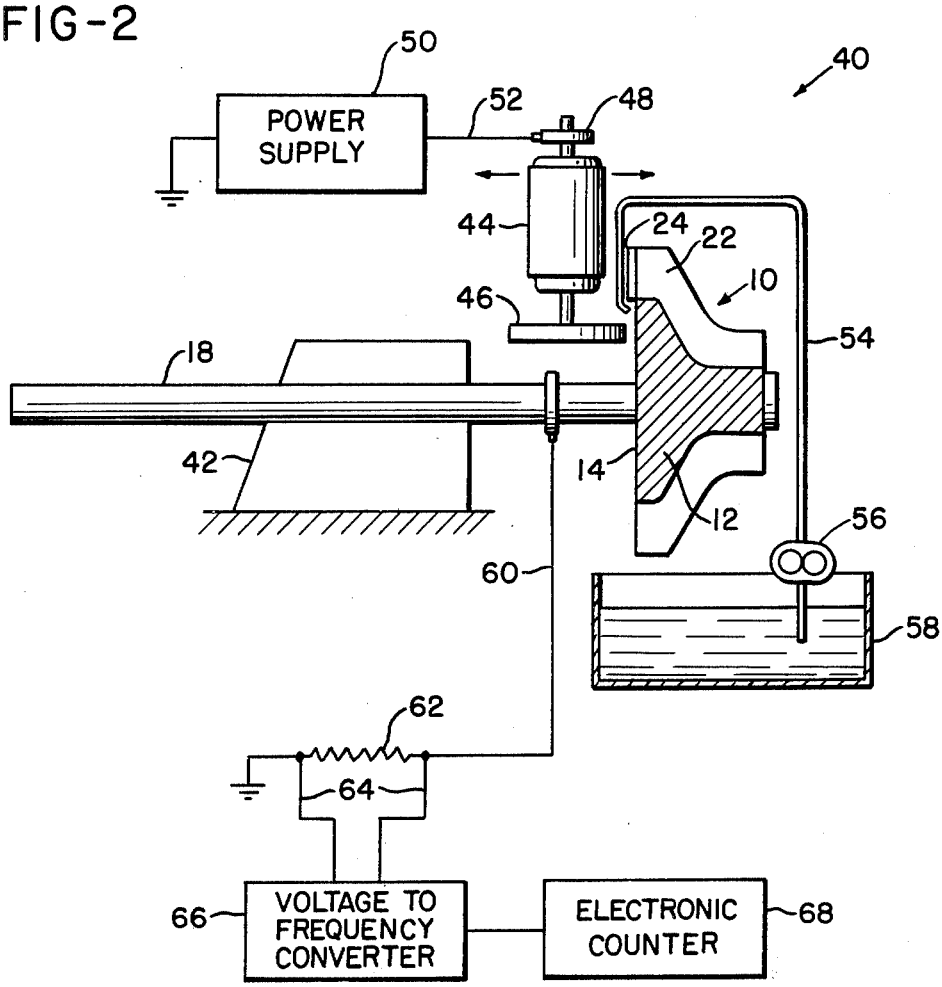

METHOD OF BALANCING A ROTATABLE ELEMENT

The present invention relates to precision balancing of rotatable elements and more particularly to an operation adapted for mass production output.

There are many instances where mass production precision balancing of a rotatable element is crucial for adequate product performance. Nowhere is this more true than in the field of turbomachinery and particularly turbochargers. These devices consist of a turbine and shaft assembly journaled for rotation so that exhaust gases from an internal combustion engine drive the turbine to produce a rotatable output. A compressor is connected to the shaft and rotation of the turbine causes the compressor to pressurize air and therefore increase its density for delivery to the cylinders of the engine. These elements rotate at a very high rate which can exceed 50,000 rpm. The bearing system for the turbocharger is of a floating type that attempts to damp out oscillation of the shaft due to unbalance. However, it is important that the shaft and turbine be balanced to such a fine degree that the oscillations are within the damping capabilities of the bearing system.

In the past, these units have been balanced by equipment that balances both statically and dynamically as will be described in detail below. These machines provide an indication of the amount of the unbalance in mass units and its location. Based on this information an operator utilizes a grinding wheel capable of grinding hard material to remove that amount of mass he feels, in his opinion, to be removed to balance the wheel. This operation is dependent to a high degree on the skill and experience of the operator in judging how much material should be removed and manually removing the material. Such a process, while reasonably effective in providing a balanced wheel, does not provide a rapid balancing procedure.

In an attempt to make the material removal part of the balancing operation more efficient, electro-chemical machining has been adopted. This process involves placing the turbine-shaft assembly in a chuck and removing material by an electro-chemical process also to be described below. The removal of the material is controlled by a cam stop which varies the depth to which the work piece penetrates the turbine wheel. Such a process, while offering a substantial increase in productivity over the mechanical removal method, still has variations in accuracy due to inaccuracies of cam position, variations in contour of the part and initial positioning of the turbine-shaft assembly.

The above problems are solved by making the removal of material depend upon the time integrated current flow of the electro-chemical machining process so that material can be accurately removed by terminating the electro-chemical machining process when the time integrated current flow reaches a predetermined level selected by the unbalance detecting machine.

The above and other related features of the invention will be apparent from a reading of the following description of the invention and the novelty thereof pointed out in the appended claims.

In the drawings:

FIG. 2 is a schematic representation of a material removal process which embodies the present invention and which is used to remove material to balance the turbine-shaft assembly of FIG. 1.

Figure 1:
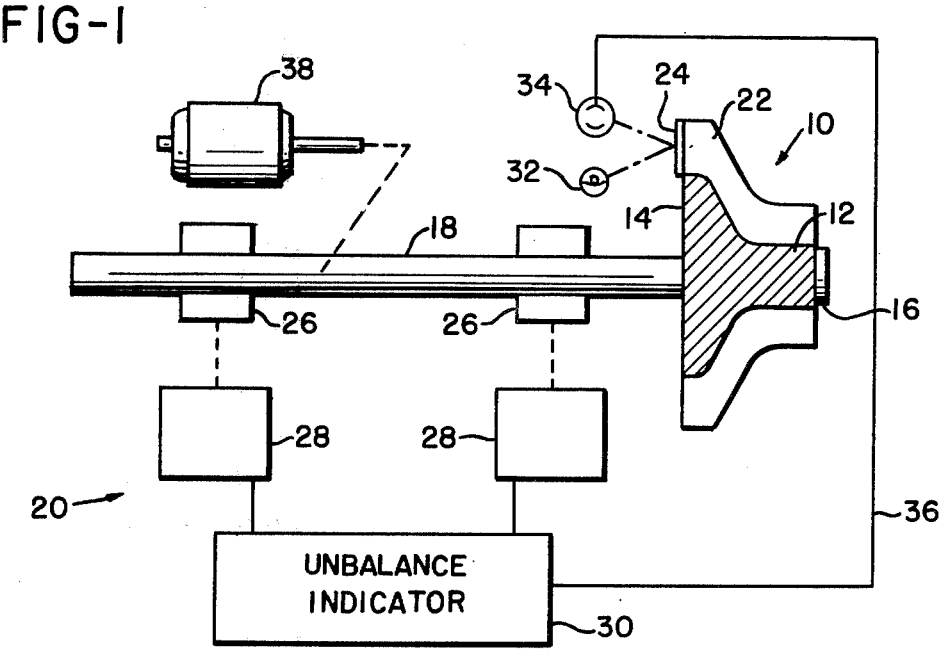
FIG. 1 is a schematic illustration of an a for determining the static and dynamic unbalance of a wheel.

Referring now to FIG. 1 there is shown an apparatus for measuring the static and dynamic unbalance in a rotating assembly comprising a turbine wheel 10 having a hub 12 with a back face 14 and a nose portion 16. A shaft 18 is connected to the turbine wheel housing 12 by a suitable joining process so that the turbine and shaft rotate as an assembly. The angular location of the mass which contributes to the unbalance in the wheel and its magnitude are detected by the system generally indicated at 20. This is a system that is commercially available from the Gilman Engineering & Manufacturing Co., Janesville, Wis., 53545, as model #HB-S-35 balancing machine. Since this machine is commercially available, many of its details will be omitted. However, for purposes of describing the present invention a brief description follows.

A reference vane 22 on the turbine is painted with reflective paint on its back edge at 24. The shaft 18 is journaled in flexible bearing assemblies 26. The lateral movement of the bearing assemblies 26 is detected by separate transducers 28 which feed a signal representing the degree of movement to an unbalance indicator 30 adapted to indicate units of unbalance. A light 32 shines toward the back edge of the vane. When the reflective surface 24 passes the light, the light beam is passed to a photo cell 34. The photo cell 34 generates a reference signal fed to the unbalance indicator via line 36 to provide an angular reference for the excess mass contributing to the unbalance of the wheel. The system 20 is designed to indicate unbalance in two planes, one of which coincides with the back face 14 of the turbine hub 12 and the other corresponds to the nose portion 16. A suitable motor 38 is releasably connected to the shaft 18 to drive the turbine-shaft assembly so that the degree of unbalance can be obtained under dynamic conditions. This system not only detects pure offset of weight, but detects presence of a couple produced by unbalance in the two planes mentioned just above.

To summarize the above, the system 20 produces an indication of the angular position and the magnitude of mass which contributes to the unbalance of the wheel. Once the operator has determined these parameters, he positions the turbine-shaft assembly 10 in the system described in FIG. 2 and designated with the reference character 40.

The system 40 comprises a suitable chuck 42 adapted to releasably position the wheel assembly 10 in a predetermined angular position corresponding to the angular position determined by unbalance indicator 30. For purpose of illustration only, that position is shown as the position where the reflective paint 24 is in the 12 o'clock position.

Material is removed from the back face 14 of the turbine hub 12 by an electro-chemical machine process herein illustrated as an electro-chemical grinding process. A machine for accomplishing this operation may be purchased commercially from SETCO Industries, Inc., Cincinnati, Ohio 45233, under model #6106LY super precision CTC electrolytic motorized spindle. It consists of a motor 44 driving a grinding wheel 46 that conducts electricity and contains abrasive material. Typical of such wheels are diamond particles embedded in matrix of silver. The wheel 46 is supplied with a heavy flow of current through a brush assembly 48 which receives current from a power supply 50 through line 52. A typical power supply suitable for this purpose will have a capacity of up to 1000 amps at 12 volts.

An electrolyte solution is passed between the wheel 46 and the face 14 of the turbine hub 12 from a conduit 54 which leads to a pump 56 drawing from a suitable supply container 58. The electrolyte solution is one which can pass electricity and typically contains sodium chloride and sodium nitrite dissolved in water. The turbine hub 12 is connected to ground by a line 60 connected to chuck 42 which is conductive.

During electro-chemical grinding current flows from the grinding wheel 46 through the electrolyte to the turbine wheel hub 12. A process of anodic dissolution takes place which removes material from the hub 12. The electrolyte assists in carrying this material away. It may be loosely termed electroplating in reverse. An oxide coating tends to form on the surface of the material being removed and inhibits the process. The grinding wheel 46 removes this coating so that the electro-chemical grinding can take place. Within reasonable feed rates, about 10% of the material is removed through contact with the abrasive particles.

A shunt resistor 62 is series connected in line 60 so as to provide a relatively small, but precise, voltage drop proportional to variations in current flow through line 60. This resistor is available commercially and generally is designed to produce milivolt readings directionally proportional to current flow through resistor 62. The voltage drop across resistor 62 is fed by lines 64 to a voltage to frequency converter 66. Such a converter is available from Anadex Corporation under model #DF-100 voltage to frequency converter. The frequency output of device 66 is then fed to a counter 68 set to accumulate pulses as a totalizer. Hewlett-Packard model 5321B electronic counter is suitable for this purpose. Arrangement of resistor 62, voltage to frequency converter 66, and electronic counter 68 act to produce a digital reading that is directly proportional to the time integrated current flow through line 60.

Figure 3:
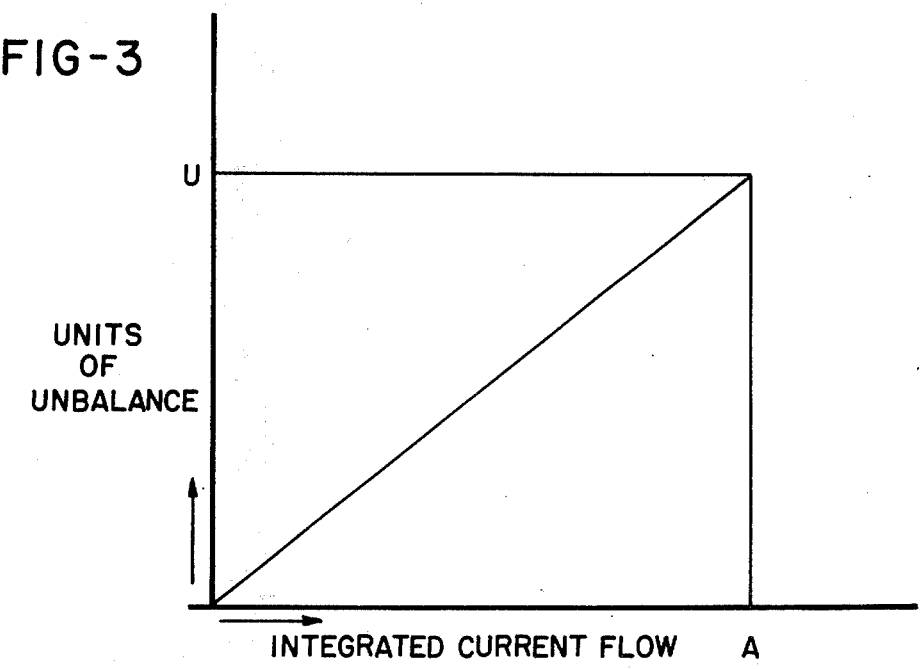
FIG. 3 is a graph indicating the mass of material removed as a function of the time integrated current flow of the electro-chemical machining process of FIG. 2.

The system illustrated in FIG. 2 is operated to remove precise masses of material from the turbine hub 12 as described below. It is known that the mass of material removed by a electro-chemical machine process is directly proportional to the time integrated current flow from the machining tool to the part to be machined to ground taking into account the small percentage of mechanical removal. This correlation is illustrated in FIG. 3 wherein increasing units of unbalance are indicated on the Y axis and increasing units of time integrated current flow (ampere seconds) are indicated on the X axis. As illustrated, the resultant curve shows a direct proportionality between the variables. It should be noted that other fixed relationships can be empirically derived.

When an operator balances the turbine-shaft assembly using the system described above, he undertakes the following steps. First the degree of unbalance in mass units and angular position are determined using the apparatus of FIG. 1 or other suitable apparatus. Then the wheel is positioned in the apparatus of FIG. 2 in the angular position indicated by the apparatus of FIG. 1. It is illustrated herein as the vane with reflective paint 24 in the 12 o'clock position. Assuming that units of unbalance U are determined then the graph of FIG. 3 is used to read the ampere seconds of current necessary to remove the units of unbalance to bring the wheel to a balanced condition. Alternately, a table or formula and the like can be used. The ampere seconds A are noted and the electro-chemical grinding process started and continued until the electronic counter reads a value which corresponds to the ampere seconds A. When this is reached the machining process is terminated.

The result of the above process is a highly precise method of balancing a wheel without the need to compensate for geometric variations in the assembly to be machined. Furthermore it lends itself well to mass production techniques since the quantity to be removed is known ahead of time and can be precisely controlled using the ampere second relationship.

Although the present invention has been described in connection with the balance of a turbine-wheel assembly, it should be apparent to those skilled in the art that it may be used for other rotating assemblies and used with different electrical chemical machining processes without departing from its spirit and scope.

Having thus described the invention what is claimed as novel and desired to be secured by letters patent of the United States is;

1. A method of precision balancing a rotatable turbine wheel shaft assembly comprising the steps of:
   determining the angular position of unbalance location and degree of unbalance in mass units of unbalance on a rotatable element,
   machining material from said rotatable element at said unbalance location using an electrical chemical machining process in which mass material removed is proportional to the time integrated electric current flow of said process,
   said turbine wheel-shaft assembly is electrically connected to a ground connection and the time-integrated current flow of said process is determined through said connection;
   terminating said electrical machining process when the time-integrated current is at a value that produces the required removal of determined mass units of unbalance.

2. A method as in claim 1 wherein said material is machined from said rotatable element using a electro-chemical grinding process.

* * * * *